Patented May 8, 1951

2,552,442

UNITED STATES PATENT OFFICE 2,552,442

ELECTRICALLY CONTROLLED TAILGATE RELEASE AND AUTOMATIC RESET DEVICE

James L. McClish, Winters, Calif.

Application October 4, 1948, Serial No. 52,686

9 Claims. (Cl. 298—23)

1

This invention is directed in general to dump trucks of the type which include a tiltable dump body and a normally latched tailgate at the discharge end of the body; the invention providing, as an object, a novel release and reset mechanism for the tailgate latch, and such mechanism being remote controlled by the truck driver from the cab.

The present invention represents a modification of the device shown in my United States Letters Patent No. 2,237,838, dated April 8, 1941.

It is a further object of the invention to provide a tailgate latch release and reset mechanism, which includes a novel electrically controlled trip device which is normally free or disconnected with respect to the remainder of the mechanism whereby to assure against any possible jamming of, or damage to, said trip device upon lowering of the dump body and resultant resetting of the latch.

An additional object of the invention is to provide a tailgate latch release and resetting device, as in the preceding paragraph, wherein the trip device is driven by an electric motor shielded within the cab protector; there being means arranged to prevent the depending trip rod, which is actuated by said motor, from stopping in lower dead-center position.

Another object of the invention is to provide a tailgate latch release and reset mechanism which embodies a novel reset assembly arranged to automatically cause resetting of the latch upon lowering of the body from inclined dumping position to horizontal transport position.

It is also an object of the invention to provide a tailgate latch release and resetting mechanism, as in the preceding paragraph, wherein the reset is accomplished by means including a spring on the frame of the truck, and a movable cam on the dump body; the spring engaging and moving the cam upon lowering of the body, and the cam in turn actuating the latch by intermediate parts as hereinafter described. As the spring is under load, when the body is lowered, such spring acts as a safety means to hold the latch, and tailgate, closed during transport of a load.

A further object of the invention is to provide a practical and reliable tailgate latch release and reset mechanism, and one which will be exceedingly effective for the purpose for which it is designed.

These objects are accomplished by means of such structure and relative arrangement of parts as will fully appear by a perusal of the following specification and claims.

2

Figure 1:
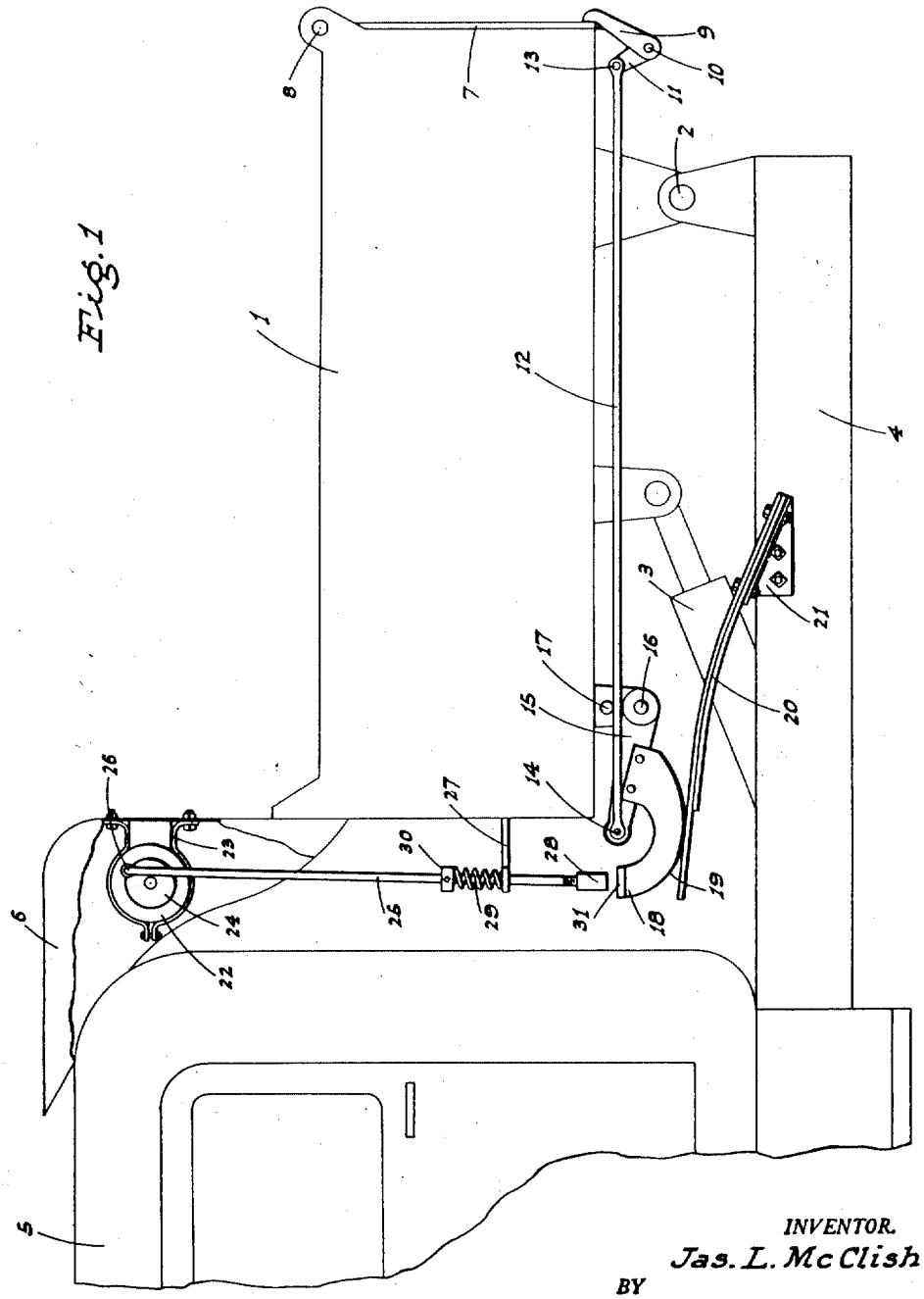
Fig. 1 is a diagrammatic side elevation of a dump truck embodying the present invention; the dump body being shown in its lowered transport position, and the tailgate latch release and reset mechanism being in its normal position.
Figure 2:
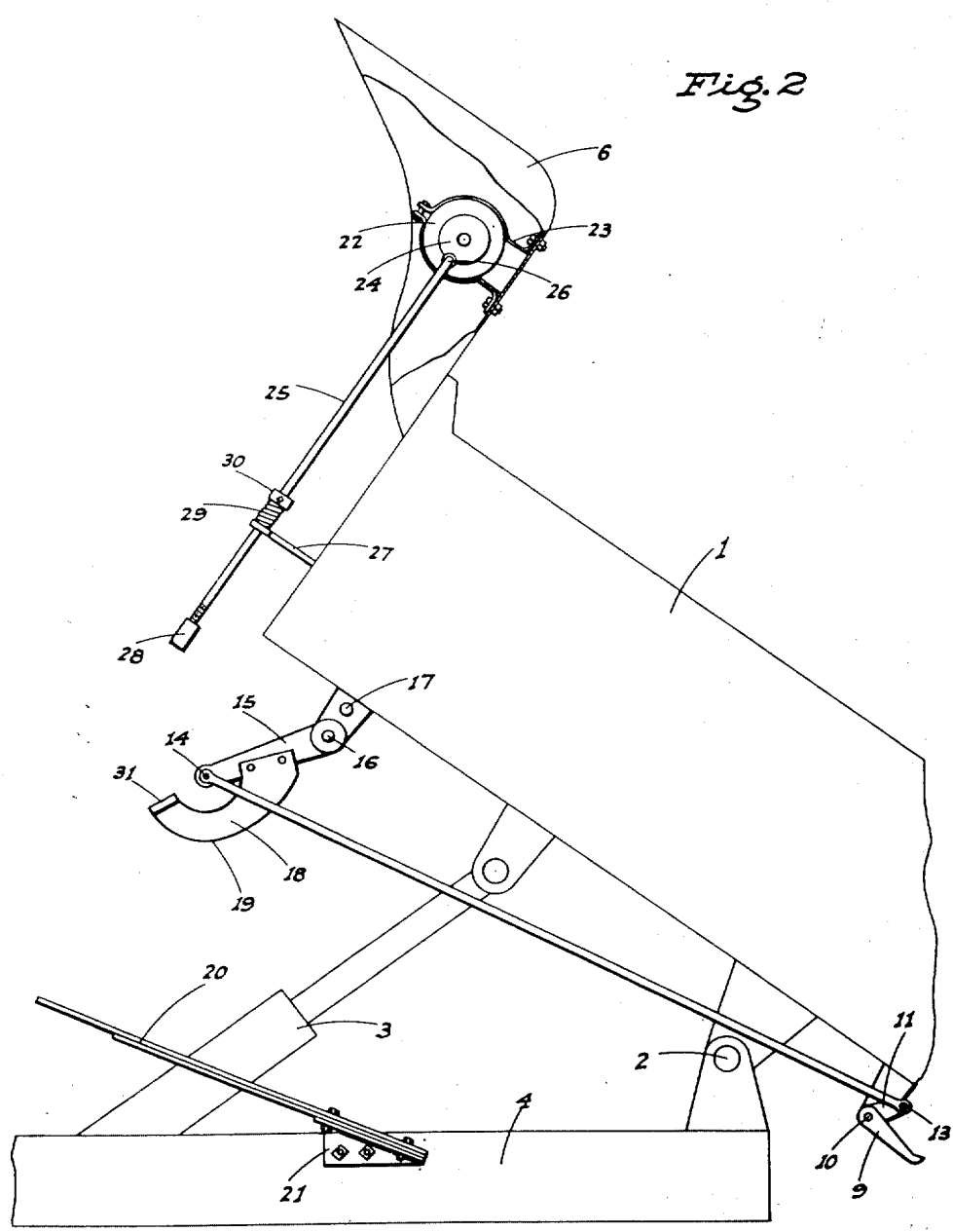
Fig. 2 is a similar view, but shows the dump body tilted to discharge position, with said mechanism tripped to release the latch.

Referring now more particularly to the characters of reference on the drawings, the invention is adapted to be embodied in a dump truck of the type which includes a dump body 1 pivoted, as at 2, for rearward and upward swinging motion, under the influence of a power unit 3, between a horizontal carrying or transport position, as in Fig. 1, to an inclined dumping position, as in Fig. 2. The main frame of the truck is indicated at 4, and said truck includes a cab 5 ahead of the body 1.

A hood-type cab protector 6 is mounted on the forward end of the body 1, and normally overhangs the cab 5.

The dump body 1 includes, at its rear end, a tailgate 7, hinged at the top, as at 8, for rearward and outward swinging motion to permit of discharge of the load. The tailgate 7 is normally held in a closed position by means of a hook-type latch 9 adjacent each side, and which extends at an upward and rearward incline from a transverse pivot shaft 10. A radial lever 11 is fixed to the pivot shaft 10 adjacent the end thereof, and normally extends at a forward and upward incline; there being a longitudinally extending rod 12 pivoted, at its rear end, as at 13, to the lever 11, and thence extending forwardly therefrom normally generally parallel to the bottom of the body 1.

Adjacent the forward end of the body 1, the rod 12 is pivoted, as at 14, to the outer end of a normally upwardly and forwardly inclined radial lever 15 affixed to a pivot shaft 16 secured in connection with said body 1. When the latch 9 is in set position holding the tailgate 7 closed, the rod 12 is above dead-center with respect to the pivot shaft 16 and abuts a stop 17 from below.

The radial lever 15 is attached, intermediate its ends, to a forwardly projecting shoe or cam 18 of generally upwardly facing C-shape, and said cam includes an arcuate lower edge 19.

The rod 12 is maintained in its above-dead-center position, when the body 1 is lowered, by means of a forwardly and upwardly inclined leaf spring unit 20 mounted on the frame 4; as at 21; such leaf spring unit 20 then being loaded by reason of the engagement therewith, from above, of the cam 18, as in Fig. 1.

At the forward end thereof the body 1 is fitted with the following trip device:

An electric motor unit 22, preferably including reduction gearing, is mounted by a bracket 23 within the cab protector 6, and such electric motor 22 includes an eccentric 24 having a transverse axis.

A trip rod 25 is connected, at its upper end, to the eccentric 24 in offset relation to its axis, as at 26.

Adjacent, but short of, its lower end the trip rod 25 runs through a guide 27, and at its lower end said rod is fitted with a foot 28.

A compression spring 29 surrounds the trip rod 25 between the top of the guide 27 and a collar 30; such spring being loaded so that it urges the trip rod 25 upward at all times, and assures against the possibility of such rod stopping on lower dead-center.

The forwardly projecting cam 18 includes, at its forward end, a lateral trip plate 31 alined, vertically, with the foot 28, but normally spaced therefrom a short distance.

The above described tailgate latch release and reset mechanism functions as follows:

When it is desired to dump the body 1, it is swung from its horizontal transport position of Fig. 1 to its inclined discharge or dumping position of Fig. 2, and then the electric motor unit 22 is actuated so that the eccentric 24 thrusts the trip rod 25 downward from its normally raised or retracted position. When this occurs the foot 28 engages the trip plate 31 and swings the cam 18 downwardly to its released position of Fig. 2. This causes the rod 12 to swing downward below dead center with respect to the pivot shaft 16, pushing rearwardly on the rod 12, which swings the lever 11 rearwardly and the latch 9 downwardly, releasing the tailgate 7.

As soon as the release of the tailgate is effected, the trip rod 25 returns to its normal raised starting position, as in Fig. 1. It is contemplated that the electric motor unit 22 will be remote controlled from the cab 5 by a suitable wiring system (not shown), but which may be of the type shown in the above identified patent, No. 2,237,838.

After the load is discharged, and upon return of the body 1 to horizontal transport position, the latch 9 is automatically reset; this by reason of the engagement of cam 18 with the spring unit 20, loading the latter, which loading urges the cam 18 upwardly until the rod 12 passes above dead-center and rests against the stop 17, at which time the latch 9 has been pulled to its tailgate closing position.

The spring unit 20 is, in effect, a safety device. This is for the reason that in the event of material being lodged between the tailgate and body, or in the latch, the spring will prevent damage thereto upon lowering of the body 1.

The foot 28 is adjustable on the lower end of the trip rod 25, whereby said foot may be set, with proper spacing, with respect to the trip plate 31.

The described tailgate latch release and reset mechanism is a practical and reliable structural arrangement for the intended purpose; the release of the latch being wholly remote controlled from the cab, and the resetting being automatic as the dump body returns to its carrying position.

From the foregoing description it will be readily seen that there has been produced such a device as substantially fulfills the objects of the invention, as set forth herein.

While this specification sets forth in detail the present and preferred construction, still in practice such deviations therefrom may be resorted to as do not form a departure from the spirit of the invention, as defined by the appended claims.

Having thus described the invention, the following is claimed as new and useful, and upon which Letters Patent are desired:

1. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, a cam mounted on the lever, a spring on the truck frame engaging the cam and urging the lever upward when the dump body is in transport position, upward motion of said lever actuating the control rod to set the latch, and means operative to swing the lever in the opposite direction to cause the control rod to release the latch.

2. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, a cam mounted on the lever, a spring on the truck frame engaging the cam and urging the lever upward when the dump body is in transport position, upward motion of said lever actuating the control rod to set the latch, and means operative to swing the lever in the opposite direction to cause the control rod to release the latch; the cam being generally C-shaped and opening upward, and the spring being of leaf type and mounted for engagement and loading from above by the cam.

3. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, spring means operative to urge the lever upward when the dump body is in transport position, upward motion of the lever actuating the control rod to set the latch, and power driven means on the body operative to swing the lever downward to cause the control rod to release the latch; said power driven means including a normally raised upstanding trip rod mounted for sliding motion on the body, downward sliding of the trip rod swinging the lever downward, and an electric motor unit on the body and connected to the trip rod in reciprocating relation thereto.

4. A mechanism, as in claim 3, in which the body includes a forwardly projecting cab protector; the electric motor unit being within said protector.

5. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, spring means operative to urge the lever upward when the dump body is in transport position, upward motion of the lever actuating the control rod to set the latch, a trip member mounted in connection with the lever, and an upstanding trip rod slidably mounted on the body in alinement above the trip member, the trip rod normally being raised with its lower end adjacent but short of said member, and an electric motor unit on the body and connected to the trip rod in reciprocating relation thereto, lowering of the latter causing its engagement with the trip member and downward motion of the lever actuating the control rod to release the latch.

6. A mechanism, as in claim 5, including a vertically adjustable foot on the lower end of said trip rod.

7. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, a cam secured to the lever and having a lower cam edge and an upwardly facing trip member, a spring on the truck frame engaged and loaded by the cam when the dump body is in transport position, the lever then being urged upward actuating the control rod to set the latch, an upstanding trip rod slidably mounted on the body in alinement above the trip member, the trip rod normally being raised with its lower end adjacent but short of said member, and power means to reciprocate the trip rod, lowering of the latter causing its engagement with the trip member and downward motion of the lever actuating the control rod to release the latch.

8. In a dump truck including a dump body having a tailgate and a latch for the same; a tailgate latch release and reset mechanism comprising a control rod extending longitudinally of the body forwardly from the latch, a longitudinally extending swing lever pivoted in connection with the body adjacent its forward end, the control rod being pivoted to the lever for actuation thereby, a cam secured to the lever and having a lower cam edge and an upwardly facing trip member, a spring on the truck frame engaged and loaded by the cam when the dump body is in transport position, the lever then being urged upward actuating the control rod to set the latch, an upstanding trip rod slidably mounted on the body in alinement above the trip member, the trip rod normally being raised with its lower end adjacent but short of said member, and means to reciprocate the trip rod; lowering of the latter causing its engagement with the trip member and downward motion of the lever actuating the control rod to release the latch.

9. A structure as in claim 8, including means to adjust the position of the lower end of the trip rod relative to said trip member.

JAMES L. McCLISH.

REFERENCES CITED

The following references are of record in the file of this patent:

UNITED STATES PATENTS

| Number | Name | Date |
|---|---|---|
| 1,654,032 | Avery | Dec. 27, 1927 |
| 1,712,534 | Walsh et al. | May 14, 1929 |
| 1,735,065 | Walsh et al. | Nov. 12, 1929 |
| 1,743,094 | Barrett | Jan. 14, 1930 |
| 1,953,762 | Kuchar | Apr. 3, 1934 |
| 2,261,745 | Sand | Nov. 4, 1941 |